(12) United States Patent
Washington et al.

(10) Patent No.: US 9,248,793 B2
(45) Date of Patent: Feb. 2, 2016

(54) SYSTEMS AND METHODS FOR LOCATION BASED CUSTOMIZATION

(71) Applicant: GM GLOBAL TECHNOLOGY OPERATIONS LLC, Detroit, MI (US)

(72) Inventors: Brandon L. Washington, Lindenhurst, IL (US); Richard J. Lange, Troy, MI (US); Matthew Tsien, Bloomfield Hills, MI (US); Brian D. Drake, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 13/866,999

(22) Filed: Apr. 19, 2013

(65) Prior Publication Data

US 2014/0316609 A1    Oct. 23, 2014

(51) Int. Cl.
*B60R 16/037* (2006.01)

(52) U.S. Cl.
CPC .................................. *B60R 16/037* (2013.01)

(58) Field of Classification Search
CPC .... G01C 21/26; B60K 35/00; B60R 16/0231; B60R 16/037; B60R 25/01; B60R 25/016; E05B 77/00; E05B 77/54; E05B 81/01; E05B 81/00; E05B 81/12; E05B 81/13
USPC ...................................... 701/36, 49, 410, 300
See application file for complete search history.

(56) References Cited

U.S. PATENT DOCUMENTS

| 4,942,349 | A | * | 7/1990 | Millerd | B60S 1/485 |
| | | | | | 15/250.13 |
| 4,996,515 | A | * | 2/1991 | Schaffer | B60R 25/10 |
| | | | | | 307/10.2 |
| 5,059,877 | A | * | 10/1991 | Teder | B60S 1/0818 |
| | | | | | 15/250.001 |
| 5,508,595 | A | * | 4/1996 | Schaefer | B60S 1/0818 |
| | | | | | 318/444 |
| 5,777,546 | A | * | 7/1998 | Dean | B60Q 9/00 |
| | | | | | 180/281 |

(Continued)

FOREIGN PATENT DOCUMENTS

| DE | 3530098 A1 | * | 2/1987 | ............ B60J 7/0573 |
| DE | 102007002563 A1 | * | 7/2008 | ........... B60Q 3/0293 |
| JP | 2006027534 A | * | 2/2006 | |

OTHER PUBLICATIONS

USPTO, Non-Final Office Action for U.S. Appl. No. 13/866,992, mailed Jul. 30, 2014.

(Continued)

*Primary Examiner* — Thomas G Black
*Assistant Examiner* — Sara Lewandroski
(74) *Attorney, Agent, or Firm* — Ingrassia Fisher & Lorenz, P.C.

(57) ABSTRACT

Methods and apparatus are provided for a customization control system for a vehicle having a cabin. The apparatus can include a source of vehicle location data, and a door coupled to the cabin and including a window movable relative to the door between a first, closed position and a second, opened position. The apparatus can also include a customization module that, based on the vehicle location data, outputs setting data for the vehicle that includes a movement for the window relative to the door.

10 Claims, 8 Drawing Sheets

(56) References Cited

U.S. PATENT DOCUMENTS

| | | | | |
|---|---|---|---|---|
| 6,075,454 | A * | 6/2000 | Yamasaki | G07C 9/00309 307/10.5 |
| 6,297,731 | B1 * | 10/2001 | Flick | B60R 16/03 180/287 |
| 6,449,572 | B1 * | 9/2002 | Kurz | B60K 41/004 702/92 |
| 6,922,622 | B2 * | 7/2005 | Dulin | B60B 1/0215 180/272 |
| 7,170,419 | B2 * | 1/2007 | Masui | B60R 25/00 340/425.5 |
| 7,180,454 | B2 * | 2/2007 | Asakura | B60R 25/245 343/713 |
| 7,463,972 | B2 * | 12/2008 | Yamada | G01C 21/3484 340/988 |
| 7,482,773 | B2 * | 1/2009 | Heyn | B60J 7/0573 318/280 |
| 7,928,837 | B2 * | 4/2011 | Drew | G01C 21/00 340/438 |
| 8,768,539 | B1 * | 7/2014 | Clement | B60W 10/18 701/2 |
| 8,827,027 | B2 * | 9/2014 | Syvret | E05F 15/1684 180/271 |
| 9,142,071 | B2 * | 9/2015 | Ricci | G07C 9/00158 1/1 |
| 2002/0143452 | A1 * | 10/2002 | Losey | B60J 7/0573 701/49 |
| 2003/0098781 | A1 * | 5/2003 | Baset | B60R 25/2009 340/5.72 |
| 2003/0122426 | A1 * | 7/2003 | Aiyama | E05B 41/00 307/10.1 |
| 2007/0109785 | A1 * | 5/2007 | Wittorf | B60Q 3/0293 362/276 |
| 2007/0203618 | A1 * | 8/2007 | McBride | B60R 25/24 701/12 |
| 2007/0255468 | A1 * | 11/2007 | Strebel | B60N 2/002 701/49 |
| 2008/0046251 | A1 * | 2/2008 | Agapi | G10L 15/07 704/275 |
| 2009/0069984 | A1 * | 3/2009 | Turner | E05F 15/71 701/49 |
| 2010/0268424 | A1 * | 10/2010 | Binfet | E05B 77/48 701/45 |
| 2011/0298580 | A1 * | 12/2011 | Nakashima | B60R 25/24 340/3.1 |
| 2012/0303178 | A1 * | 11/2012 | Hendry | B60R 16/037 701/2 |
| 2013/0275008 | A1 * | 10/2013 | Breed | B60R 16/037 701/49 |
| 2014/0203770 | A1 * | 7/2014 | Salter | H02J 7/0047 320/108 |
| 2014/0230499 | A1 * | 8/2014 | Tokoro | E05B 43/005 70/267 |
| 2014/0257630 | A1 * | 9/2014 | Ruiz | E05B 77/54 701/36 |
| 2014/0309789 | A1 * | 10/2014 | Ricci | G07C 9/00158 700/276 |
| 2015/0197205 | A1 * | 7/2015 | Xiong | B60R 16/037 701/49 |
| 2015/0239395 | A1 * | 8/2015 | Rogge | B60Q 3/0293 315/77 |

OTHER PUBLICATIONS

Lange, Richard J., US Patent Application entitled "Systems and Methods for Lock Notification," filed on Apr. 19, 2013.

* cited by examiner

SYSTEMS AND METHODS FOR LOCATION BASED CUSTOMIZATION

TECHNICAL FIELD

The present disclosure generally relates to vehicles and more particularly relates to systems and methods for customization of systems of a vehicle based on the location of the vehicle.

BACKGROUND

Many modern vehicles employ numerous features that improve driver convenience during the operation of the vehicle. In addition, many modern vehicles include systems that enable a determination of a current location of the vehicle. In certain instances, based on the location of the vehicle, it may be desirable to change the operation of one or more of the driver convenience features based on the current location of the vehicle. For example, it may be desirable to automatically move a window of the vehicle from a closed position to an opened position when the vehicle is at a drive through for driver convenience, or to automatically unlock only a single door when the vehicle is parked at a particular location for driver safety.

Accordingly, it is desirable to provide systems and methods that enable a driver of the vehicle to change the operation of one or more driver convenience features based on the current location of the vehicle. Furthermore, other desirable features and characteristics of the present invention will become apparent from the subsequent detailed description and the appended claims, taken in conjunction with the accompanying drawings and the foregoing technical field and background.

SUMMARY

An apparatus is provided for a customization control system for a vehicle having a cabin. The apparatus includes a source of vehicle location data, and a door coupled to the cabin and including a window movable relative to the door between a first, closed position and a second, opened position. The apparatus also includes a customization module that, based on the vehicle location data, outputs setting data for the vehicle that includes a movement for the window relative to the door.

A method is provided for customizing a vehicle having a cabin. The method includes determining a current geographic location of the vehicle and determining if the vehicle has visited the current geographic location previously. The method also includes outputting a user interface to save a setting for a system of the vehicle if the vehicle has visited the current location previously.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
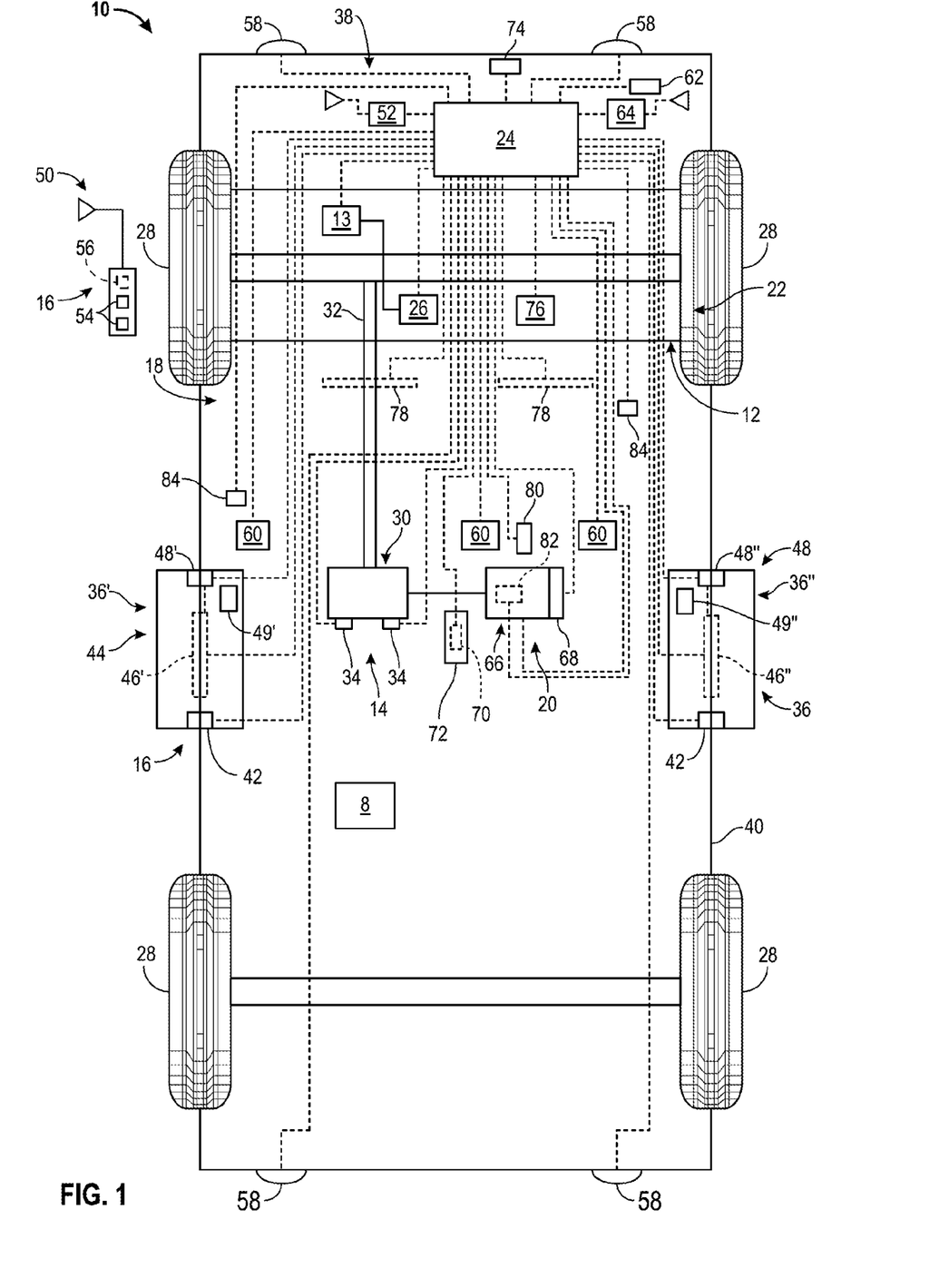
FIG. 1 is a functional block diagram illustrating a vehicle that includes a location customization control system in accordance with various embodiments.

With reference to FIG. 1, a vehicle 10 is shown. The vehicle 10 can include a powertrain 12, a steering system 14, a door system 16, a notification system 18, a navigation system 20 and at least one or a plurality of sensors 22 that can provide input to a customization module 24. The vehicle 10 can also include an entertainment system 25. As will be discussed in greater detail herein, the customization module 24 can receive inputs from the powertrain 12, steering system 14, door system 16, navigation system 20 and sensors 22 to customize the operation of one or more of the door system 16, notification system 18 and entertainment system 25 based on a geographical location of the vehicle 10.

Generally, the vehicle 10 can include the powertrain 12 for propulsion. The powertrain 12 can include, for example, a propulsion device 13, including, but not limited to, an internal combustion engine, electric engine or hybrid thereof (not shown). The customization module 24 can be in communication with the propulsion device 13 to receive or determine whether the propulsion device 13 is on, such that the vehicle 10 is movable, or if the propulsion device 13 is off. The propulsion device 13 can supply power to a transmission 26, which can transfer this power to a suitable driveline coupled to one or more wheels (and tires) 28 of the vehicle 10 to enable the vehicle 10 to move. As is known to one skilled in the art, the transmission 26 can comprise a suitable gear transmission, which can be operated in a variety of gear positions, including, but not limited to park, neutral, reverse, drive, etc. The transmission 26 can be a manual transmission or an automatic transmission, as known to one skilled in the art. The customization module 24 can be in communication with the transmission 26 to receive or determine the current position of the transmission 26. Alternatively, the current position of the transmission 26 can be provided to the customization module 24 from other modules associated with the vehicle 10, or through a transmission gear selector operable by a driver of the vehicle 10, if desired.

With continued reference to FIG. 1, the steering system 14 can include a hand wheel 30 coupled to a steering shaft 32, which can cooperate with the powertrain 12 to steer the vehicle 10. It should be noted that the use of a hand wheel is merely exemplary, as the steering system 14 can include any suitable device for steering the vehicle 10, including, but not limited to, a joystick. In this example, the hand wheel 30 can include one or more user input devices 34, which can provide an input to the customization module 24. The powertrain 12 and steering system 14 are shown only in block form and without further detailed description, as embodiments of these mechanisms are varied and well known to those skilled in the art.

The door system 16 can include one or more doors 36 and a remote keyless entry (RKE) system 38. The doors 36 can be coupled to a body 40 of the vehicle 10, and can permit ingress and egress from a cabin defined by the body 40 of the vehicle 10 as well known to those skilled in the art. The doors 36 can include, but are not limited to, entry doors, cargo doors and lift gates. Each of the doors 36 can include a lock 42 and a window system 44. The lock 42 can be any suitable mechanism, including, but not limited to, a mechanical device or an electrical device, suitable for securing the door 36 to the body 40 to prevent access to the cabin of the vehicle 10. In addition, one or more of the doors 36 can also include a manual lock actuator to enable a user of the vehicle 10 to lock or unlock the door 36 as known to those skilled in the art. The manual lock actuator can comprise any suitable user input device, which can be in communication with the customization module 24, if desired. In one example, the manual lock actuator can comprise a mechanical knob or post coupled to one or more of the doors 36 that can be manipulated to enable an operator to send a signal to the customization module 24. In another example, the manual lock actuator can comprise an electric switch coupled to one or more of the doors 36 that can be actuated to enable an operator to send a signal to the customization module 24. As a further example, one or more of the doors 36 can include both a mechanical knob or post and an electric switch, and thus, multiple lock actuators can be employed on one or more of the doors 36. Further, the manual lock actuator need not be coupled directly to one or more of the doors 36, but could be coupled to a console associated with the vehicle 10 or implemented through a user interface associated with the vehicle 10. It should be noted that the manual lock actuator is optional, as other techniques can be used to send a signal to the customization module 24.

The window system 44 can be disposed in the door 36, and can include a window 46 and a window movement device 48. The window 46 can be movable relative to the door 36 by the window movement device 48 as known to one skilled in the art. The window movement device 48 can be in communication with the customization module 24 to receive a signal to move the window 46 relative to the door 36. The window movement device 48 can comprise any suitable mechanical, electrical or electromechanical device capable of moving the window 46 relative to the door 36. The door 36 can also include a manual window actuator 49 to enable a user of the vehicle 10 to manually actuate the window movement device 48, as known to those skilled in the art. The manual window actuator 49 can comprise any suitable mechanical, electrical or electromechanical device or switch, which can actuate the window movement device 48 to move the window 46. In one example, the vehicle 10 can include a window 45 positioned in and moveable with a window movement device 48' relative to a door 36' adjacent to a driver 8 of the vehicle 10, and a window 46" positioned in and movable with a window movement device 48" relative to a door 36" adjacent to a passenger of the vehicle 10. The windows 46', 46" can be manually actuated via manual window actuators 49', 49". It should be noted that although only two doors 36', 36" are shown and described herein, the vehicle 10 can have any number of doors 36, which may or may not include a window system 44, associated with the body 40 of the vehicle 10.

The RKE system 38 can be used to send a signal to the customization module 24 to actuate one or more of the locks 42. In one example, the RKE system 38 can include a fob 50 and a receiver 52 as known to one skilled in the art. In one example, the fob 50 can include one or more user input devices 54 and a transmitter 56. In the case of an "active" RKE system 38, the user input devices 54 can be actuated by an operator to generate a signal to lock or unlock one or more of the doors 36 of the vehicle 10. The signals generated by the actuation of the user input devices 54 can be transmitted by the transmitter 56 over a suitable wireless link to the receiver 52. Alternatively, in the case of a "passive" RKE system 38, the transmitter 56 can transmit a signal to the receiver 52 when the fob 50 has left a predetermined zone associated with the vehicle 10, such as, but not limited to, about 15 feet from the vehicle 10. The receiver 52 can receive the signals from the transmitter 56 of the fob 50. The receiver 52 can be in communication with the customization module 24 to provide the signals received from the transmitter 56 to the customization module 24.

The notification system 18 can include one or more exterior visible indicators or lights 58, one or more interior visible indicators or lights 60 and at least one audible indicator 62, which can be in communication with the customization module 24. The exterior lights 58 can visually indicate that one or more of the doors 36 are locked or unlocked. In one example, the exterior lights 58 can include, but are not limited to, the headlights and taillights of the vehicle 10, however, the exterior lights 58 could comprise separate visual indicators located on the exterior of the vehicle 10 that can indicate that one or more of the locks 42 are locked or unlocked.

The interior lights 60 can comprise one or more visual indicators that can be customizable using the customization module 24 to provide various indications to the users of the vehicle 10. In one example, the interior lights 60 can comprise, but are not limited to, multi-colored light emitting diodes (LEDs), which can emit colors predetermined based on input to the customization module 24. The interior lights 60 can include, but are not limited to, one or more visual indicators or lights located within an instrument panel or console of the vehicle 10, one or more lights positioned in a foot well of the cabin of the vehicle 10, one or more lights positioned along a headliner of the vehicle 10, one or more lights positioned along one or more of the doors 36, one or more lights positioned in a seat associated with the cabin, etc. Thus, the location and number of interior lights 60 illustrated herein is merely exemplary. The audible indicator 62 can provide an audible indication that one or more of the locks 42 are locked or unlocked. In one example, the audible indicator 62 can include, but is not limited to, a horn associated with the vehicle 10.

With continued reference to FIG. 1, the navigation system 20 can be in communication with the customization module 24. The navigation system 20 can include a positioning system 64 and a display 66. The positioning system 64 can include a suitable receiver, which can receive a location of the vehicle 10 through a suitable data transmission link. For example, the location of the vehicle 10 can be received from satellite data, such as global positioning data (GPS) or from land based locational indicators, such as long range navigation (LORAN).

The display 66 can be in communication with the customization module 24 and can provide visual information to the driver 8 and/or other users of the vehicle 10. In one example, the display 66 can be implemented as a flat panel display in an instrument panel or console of the vehicle 10. Those skilled in the art realize other techniques to implement the display 66 in the vehicle 10. The display 66 can comprise any suitable technology for displaying information, including, but not limited to, a liquid crystal display (LCD), organic light emitting diode (OLED), plasma, or a cathode ray tube (CRT). The display 66 can include a user input device 68, which can receive inputs from a user, such as the driver 8 of the vehicle 10, to customize various features of the vehicle 10 based on location, as will be discussed herein. The user input device 68 may be implemented as a keyboard (not separately shown), a microphone (not separately shown), a touchscreen layer associated with the display 66, or other suitable device to receive data and/or commands from the user. Of course, multiple input devices 68 can also be utilized.

The plurality of sensors 22 detect and measure observable conditions of the vehicle 10, which can be provided to the customization module 24. The plurality of sensors 22 generate sensor signals based on the observable conditions. In one example, a brake pedal position sensor 70 detects a position of a brake pedal 72 associated with the vehicle 10, and generates brake pedal position signals based thereon. The signals received from the brake pedal position sensor 70 can be used to determine if the vehicle 10 is braking. It should be noted that the brake pedal position sensor 70 is merely exemplary, as other techniques could be employed to determine if the vehicle 10 is braking, such as a signal received from one or more sensors associated with a brake system of the vehicle 10 or a signal received from a brake light actuated upon depression of the brake pedal 72.

A speed sensor 74 can detect a speed of the vehicle 10 and can generate vehicle speed signals based thereon. It should be noted that the speed of the vehicle 10 can also be estimated or predetermined from other modules associated with the vehicle 10. A wiper sensor 76 can detect if one or more windshield wipers 78 associated with the vehicle 10 are operating. The signals received from the wiper sensor 76 can be used by the customization module 24 to determine environmental conditions surrounding the vehicle 10. It should be noted that the wiper sensor 76 is merely exemplary, as other suitable sensors could be used to determine environmental conditions surrounding the vehicle 10, such as a sensor mounted on an exterior of the vehicle 10 or a sensor mounted within the cabin of the vehicle 10 adjacent to a windshield of the vehicle 10. Further, signals can be received by the customization module 24 from other modules in the vehicle 10 that can indicate that the windshield wipers 78 are active. An ambient conditions sensor 80 can be coupled to the vehicle 10 so as to observe the ambient lighting conditions surrounding the vehicle 10. In one example, the ambient conditions sensor 80 can include a light sensor, which can detect the amount of light surrounding the vehicle 10 and can generate signals based thereon. For example, the ambient conditions sensor 80 can measure the amount of daylight the vehicle 10 is exposed to and can generate signals that indicate if the vehicle 10 is in daylight conditions and/or nighttime conditions (darkness). In certain implementations, the ambient conditions sensor 80 can also generate signals that the vehicle 10 is in dusk or twilight conditions.

The entertainment system 25 can be disposed in the cabin of the vehicle 10 and can be in communication with the customization module 24. The entertainment system 25 can entertain users of the vehicle 10 during the operation of the vehicle 10. In one example, the entertainment system 25 can be implemented with the display 66, however, the entertainment system 25 can be implemented in an instrument panel or console of the vehicle 10. In one example, the entertainment system 25 can include, but is not limited to a receiver 82 and at least one speaker 84. The receiver 82 can include, but is not limited to, an AM/FM radio receiver, which can receive radio frequency transmissions from broadcasting stations located within range of the receiver 82 as known to those skilled in the art. In this example, the radio frequency transmissions from the receiver 82 can be transmitted to the users of the vehicle 10 through the at least one speaker 84. It should be noted that the receiver 82 could also include, but is not limited to, a satellite based receiver, a Bluetooth transmission receiver, etc. The receiver 82 can be in communication with the customization module 24 to receive at least one location based setting, as will be discussed in detail herein.

The customization module 24 can generate signals that may be used to control the door system 16, notification system 18 and entertainment system 25 based on signals received from the user input devices 34, 54, 68, navigation system 20, manual window actuators 49 and the sensors 22. It should be noted that the illustration of the customization module 24 in the vehicle 10 is merely exemplary as the customization module 24 can be implemented with the navigation system 20, entertainment system 25 and/or as part of an infotainment system associated with the vehicle 10 to manage various driver convenience features based on a geographic location of the vehicle 10. In addition, the customization module 24 could be located remote from the vehicle 10, and could be implemented as a cellular phone, tablet, portable communication device or web-based application that can receive inputs from a remote user and transmit those settings to the vehicle 10. Generally, based on user input to the user input devices 34, 68, the geographical location of the vehicle 10 received from the navigation system 20 and the input from the sensors 22, the customization module 24 can control the RKE system 38, exterior lights 58, interior lights 60, audible indicator 62, locks 42, window system 44 and entertainment system 25 for the geographic location of the vehicle 10. This can provide increased driver convenience at particular geographic locations of the vehicle 10.

Figure 2:
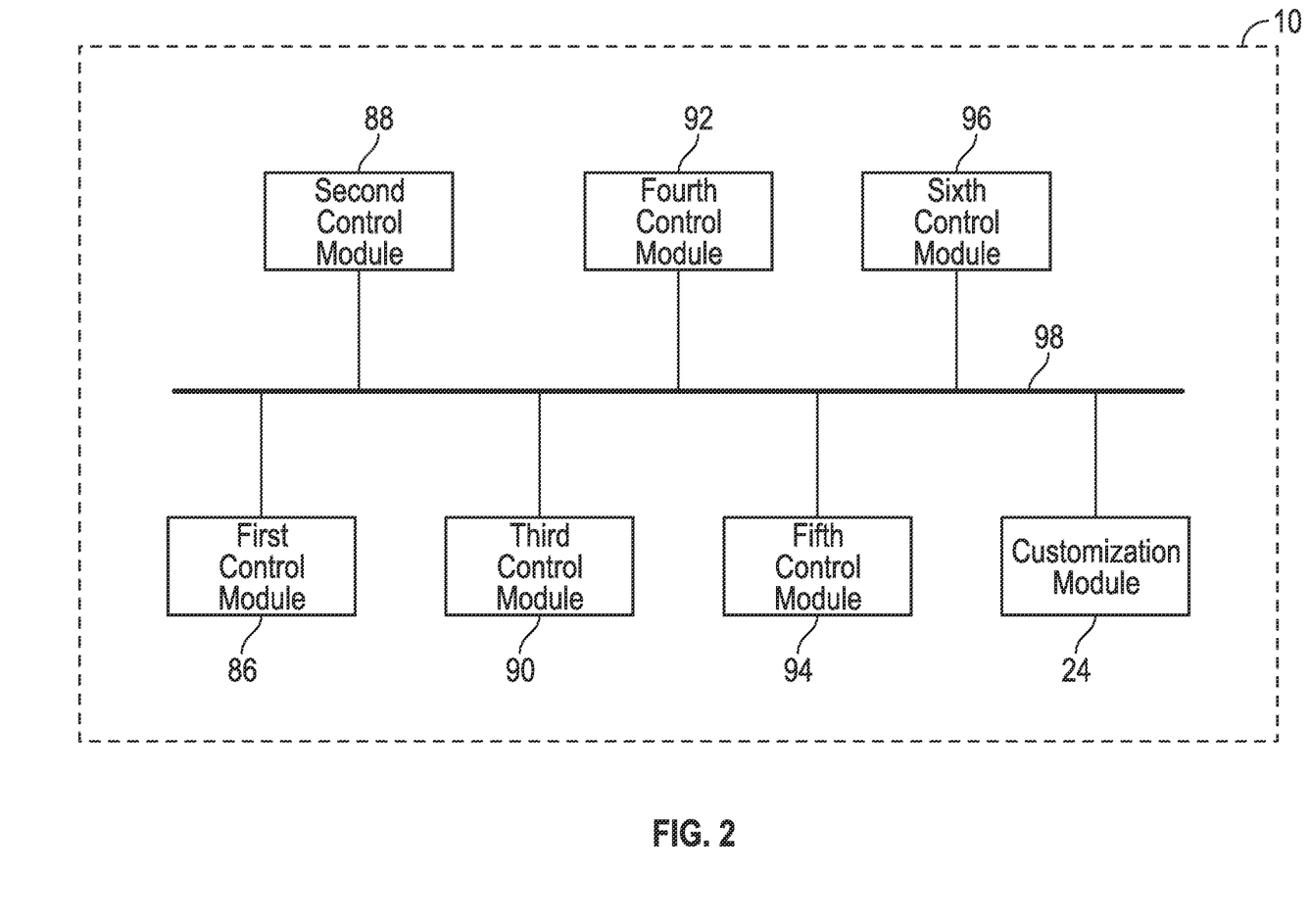
FIG. 2 is a functional block diagram of the vehicle in accordance with various embodiments.

In this regard, with reference to FIG. 2, FIG. 2 is a functional block diagram representation of an embodiment of the vehicle 10. FIG. 2 depicts various exemplary control modules that generate control signals to control features of the vehicle 10 described in FIG. 1. In one example, the vehicle 10 can include a first control module 86, a second control module 88, a third control module 90, a fourth control module 92, a fifth control module 94, a sixth control module 96 and the customization module 24, which can be coupled together via an interconnection architecture 98 or arrangement that facilitates transfer of data, commands, power, etc. As can be appreciated, the sub-modules shown in FIG. 2 can be combined and/or further partitioned to similarly control the features of the vehicle 10 described in FIG. 1.

In various exemplary embodiments, the first control module 86 can generate control signals that control the actuation of one or more of the locks 42 of the doors 36 based on data retrieved from the customization module 24 over the interconnection architecture 98. The second control module 88 can generate control signals that actuate one or more of the window movement devices 48 based on data retrieved from the customization module 24 over the interconnection architecture 98. The third control module 90 can generate control signals that actuate the audible indicator 62 based on data retrieved from the customization module 24 over the interconnection architecture 98. The fourth control module 92 can generate control signals that actuate the receiver 82 based on data retrieved from the customization module 24 over the interconnection architecture 98. The fifth control module 94 can generate control signals that actuate the interior lights 60 based on data retrieved from the customization module 24 over the interconnection architecture 98. The sixth control module 96 can generate control signals that actuate the exterior lights 58 based on data retrieved from the customization module 24 over the interconnection architecture 98. The customization module 24 can output data to the interconnection architecture 98 based on inputs sensed from the vehicle 10 (FIG. 1), received from other control modules (not shown) over the interconnection architecture 98, and/or determined/modeled by other sub-modules (not shown) within the customization module 24.

Figure 3:
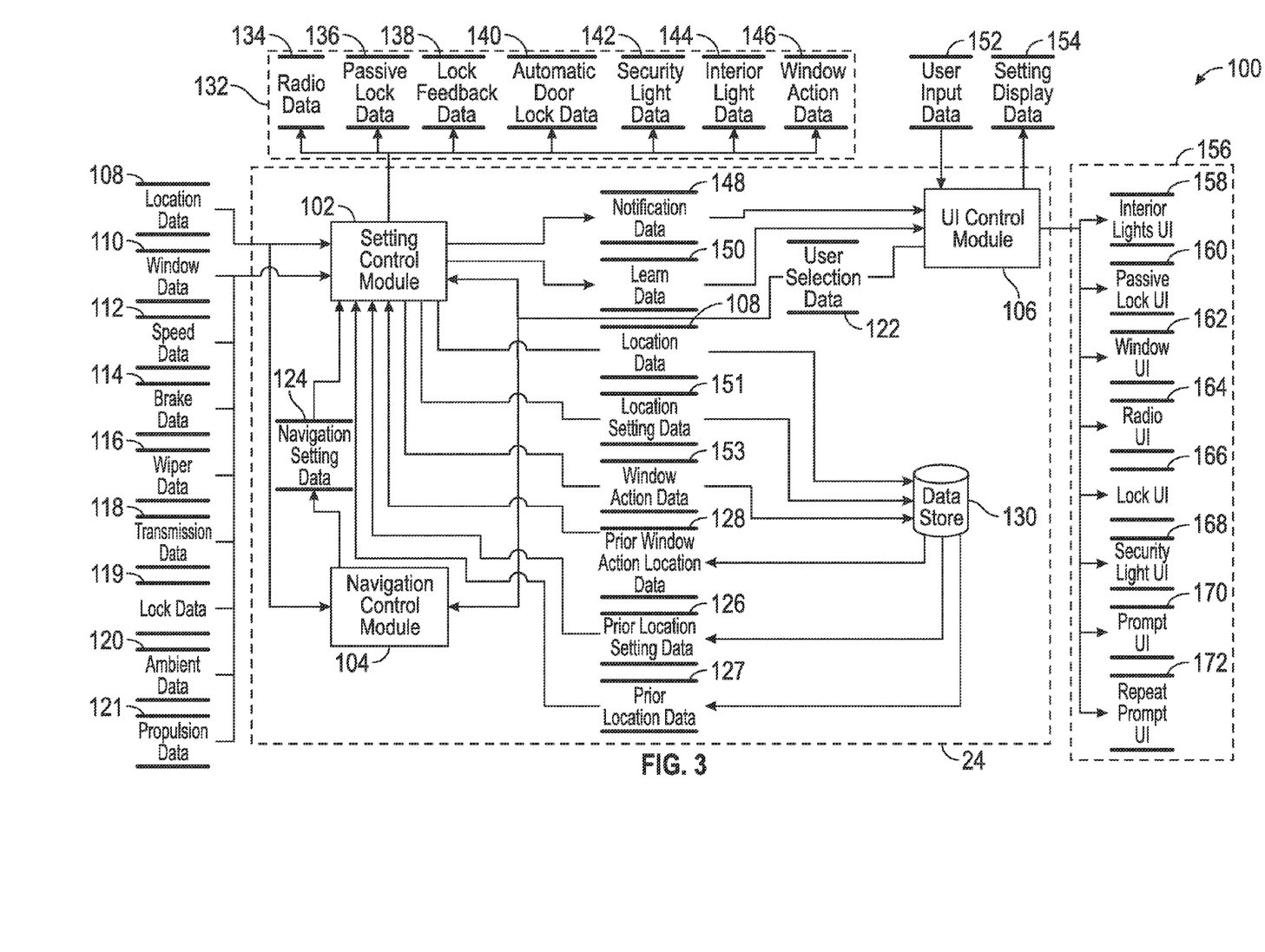
FIG. 3 is a dataflow diagram illustrating a control system of the location customization control system in accordance with various embodiments.

Referring now to FIG. 3, a dataflow diagram illustrates various embodiments of a location customization control system 100 for the vehicle 10 (FIG. 1) that may be embedded within the customization module 24. Various embodiments of the location customization control system 100 according to the present disclosure can include any number of sub-modules embedded within the customization module 24. As can be appreciated, the sub-modules shown in FIG. 3 can be combined and/or further partitioned to similarly control the geographic location based customization of the vehicle 10 (FIG. 1). Inputs to the system may be sensed from the vehicle 10 (FIG. 1), received from other control modules (not shown), and/or determined/modeled by other sub-modules (not shown) within the customization module 24. In various embodiments, the customization module 24 can include a setting control module 102, a navigation control module 104 and a user interface (UI) control module 106.

The setting control module 102 can receive as input location data 108, window data 110, speed data 112, brake data 114, wiper data 116, transmission data 118, lock data 119, ambient data 120, propulsion data 121, user selection data 122 and navigation setting data 124. The setting control module 102 can also receive as input prior location setting data 126, prior location data 127 and prior window action location data 128, which can be accessed or retrieved from a data store 130. The location data 108 can comprise the geographical location of the vehicle 10 received from the positioning system 64, which can also be saved in the data store 130. The window data 110 can comprise an indication if the window 46', 46" has been actuated by the manual window actuator 49', 49". Generally, the window data 110 can comprise data that indicates if the window 46', 46" has been moved from a first, closed position relative to the door 36', 36" to a second, opened position relative to the door 36', 36". The speed data 112 can comprise the speed of the vehicle 10 received from the speed sensor 74. The brake data 114 can comprise a detected position of the brake pedal 72, which can be received from the brake pedal position sensor 70. The wiper data 116 can comprise a signal that indicates if one or more of the windshield wipers 78 are on received from the wiper sensor 76. The transmission data 118 can comprise data that indicates a range of the transmission. In this regard, the transmission data 118 can indicate if the transmission is in a park or neutral gear range, which can be provided by the transmission 26. In certain implementations, "raw" sensor or status data provided by the transmission 26 may initiate the generation of suitable control signals that in turn are received and processed by the customization module 24. In such implementations, the control signals themselves may be generated by another control module, an interface or translation device, or the like. In other words, the transmission 26 may, but need not, be the source of the actual control/command signals that are utilized by the customization module 24.

The lock data 119 can comprise a request to actuate one or more of the locks 42 received from the fob 50 or manual lock actuator to secure the respective one or more of the doors 36 to the body 40 of the vehicle 10. The ambient data 120 can comprise an amount of daylight measured or determined by the ambient conditions sensor 80. The propulsion data 121 can whether the propulsion device 13 is on or off. The user selection data 122 can be received from the UI control module 106, and can comprise user input received from the user input devices 34, 68. In one example, the user selection data 122 can include, but is not limited to, a desired setting for one or more of the RKE system 38, exterior lights 58, interior lights 60, audible indicator 62, locks 42, window system 44 and entertainment system 25. The navigation setting data 124 can be received from the navigation control module 104, and can comprise settings associated with a planned journey for the vehicle 10. For example, a desired color for illumination of one or more of the interior lights 60 at a given point along the journey. The prior location setting data 126 can comprise a customization setting for one or more of the RKE system 38, exterior lights 58, interior lights 60, audible indicator 62, locks 42, window system 44 and entertainment system 25 for a particular geographical location, which can be stored in and accessed from the data store 130. The prior location data 127 can comprise data of prior geographical locations the vehicle 10 has visited, which can be stored in and accessed from the data store 130. The prior window action location data 128 can comprise an action for the operation of the window 46 at a particular geographical location, which can be stored in and accessed from the data store 130.

Based on the location data 108, window data 110, speed data 112, brake data 114, wiper data 116, transmission data 118, lock data 119, ambient data 120, propulsion data 121, user selection data 122, navigation setting data 124, prior location setting data 126, prior location data 127 and prior window action location data 128, the setting control module 102 can access a look-up table or calibration table, for example, and retrieve output setting data 132, which can include radio data 134, passive lock data 136, lock feedback data 138, automatic door lock data 140, security light data 142, interior light data 144 and window action data 146. The setting control module 102 can also set notification data 148 and learn data 150 for the UI control module 106, and location setting data 151 and window action data 153, which can be stored in the data store 130.

The setting data 132 can comprise user input customization settings for one or more of the RKE system 38, exterior lights 58, interior lights 60, audible indicator 62, locks 42, window system 44 and entertainment system 25 based on a particular geographic location. The radio data 134 can comprise one or more radio stations for the receiver 82 to tune to based on a particular geographic location of the vehicle 10. The passive lock data 136 can comprise a signal transmitted to the RKE system 38 to disable passive locking based on a geographic location of the vehicle 10. For example, if the vehicle 10 is parked in a known safe location, such as a user's garage, passive locking of one or more of the doors 36 of the vehicle 10 using the fob 50 can be disabled. The lock feedback data 138 can comprise a signal output to at least one of the exterior lights 58 and audible indicator 62 based on the geographic location of the vehicle 10 to notify the user that one or more of the doors 36 are locked and secured to the body 40. For example, if the vehicle 10 is located in a residential area, and it is dark, the lock feedback data 138 could comprise data to activate the exterior lights 58 to indicate that one or more of the doors 36 are locked. As a further example, if the vehicle 10 is located in an urban area, and it is dark, the lock feedback data 138 could comprise data to activate the exterior lights 58 and the audible indicator 62 to notify the user that one or more of the doors 36 are locked.

The automatic door lock data 140 can comprise a signal to unlock one or more of the doors 36 based on a geographic location of the vehicle 10 once the transmission 26 of the vehicle 10 is placed in a park position. For example, the automatic door lock data 140 can comprise a signal to unlock only the door 36' adjacent to the driver 8 when the transmission 26 is placed into the park position at a particular geographic location. The security light data 142 can comprise a signal to activate the exterior lights 58 for an extended period of time based on a geographical location of the vehicle 10. The interior light data 144 can comprise data transmitted to one or more of the interior lights 60 to activate the interior lights 60, which can include data regarding a desired color output for one or more of the interior lights 60. The window action data 146 can comprise an action for one or more of the windows 46, such as a signal to the window movement device 48 to move one or more of the windows 46 from the first, closed position to the second, opened position relative to the respective one of the doors 36.

The notification data 148 can comprise data that indicates that one or more of the user customized settings is active for a geographic location. The learn data 150 can comprise a pattern of behavior identified by the setting control module 102. For example, the learn data 150 can comprise data for prompting the user to save a setting at a frequented geographic location as setting data 132. As an example, the learn data 150 can comprise a prompt to save window action data 146 if at a particular geographic location, the driver 8 of the vehicle 10 uses the manual window actuator 49 to move the window 46' from the first, closed position to the second, opened position in more than one occurrence at the geographical location. The location setting data 151 can comprise settings for a particular geographic location, which can be saved in the data store 130. The window action data 153 can comprise data regarding action for one or more of the windows 46 received from a respective one of the manual window actuators 49 at a particular geographic location.

The navigation control module 104 can receive as input the location data 108 and the user selection data 122. Based on the location data 108 and the user selection data 122, the navigation control module 104 can access a look-up table or use any suitable method to retrieve the navigation setting data 124 for the setting control module 102.

Figure 4:
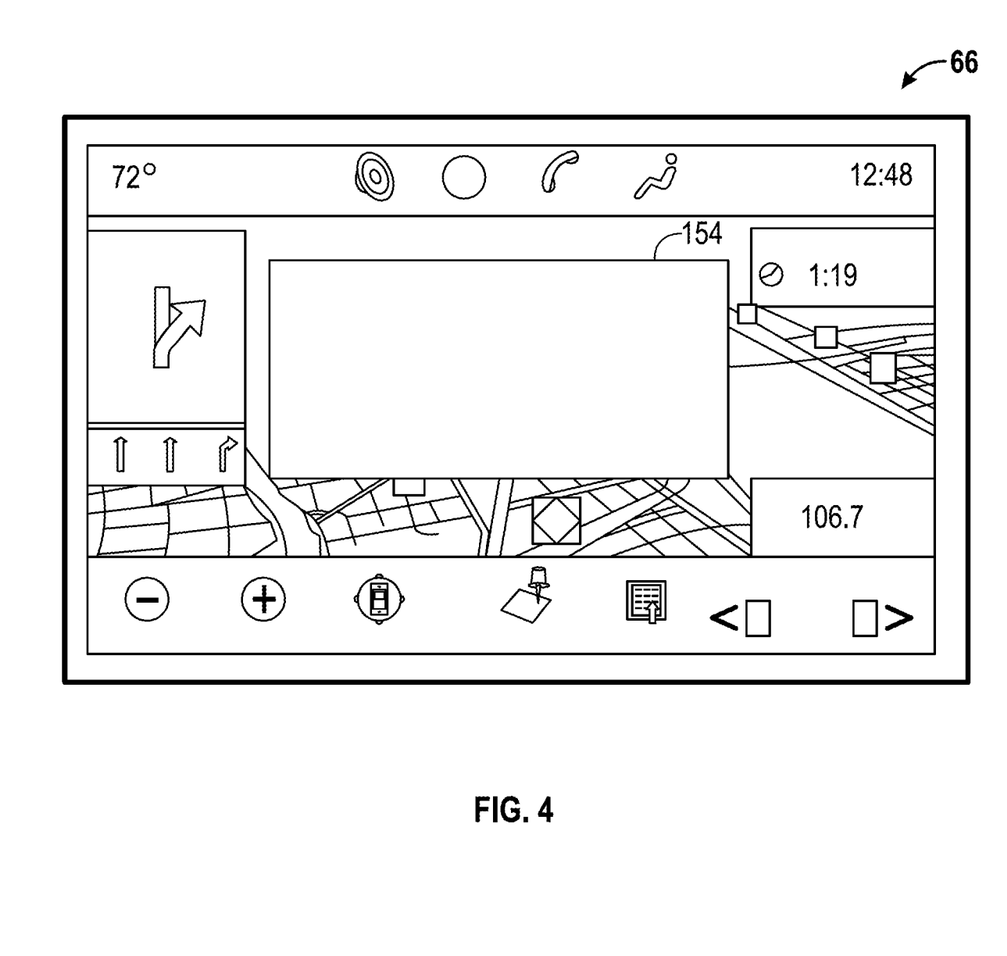
FIG. 4 is an exemplary display illustrating setting display data in accordance with various embodiments.

The UI control module 106 can receive as input the notification data 148, the learn data 150 and user input data 152. The user input data 152 can comprise input received from the user of the vehicle 10 through the user input devices 34, 68. Based on the notification data 148, learn data 150 and user input data 152, the UI control module 106 can access a look-up table, for example, and retrieve output setting display data 154 and at least one user interface 156. The UI control module 106 can also set user selection data 122 for the setting control module 102 and navigation control module 104. The setting display data 154 can comprise a graphical or textual message for display on the display 66, which can inform the users that a particular setting is active for the given geographical location, based on the notification data 148. For example, as illustrated in FIG. 4, exemplary setting display data 154 can comprise a textual message displayed in a text box that based on the geographic location of the vehicle 10, the passive locking of the RKE system 38 has been disabled. For example, the textual message can state "Arrived: Home," "Passive Locking has been disabled." The setting display data 154 can be displayed independently to the users on the display 66 or could be superimposed on the at least one user interface 156.

With reference back to FIG. 3, the at least one user interface 156 can comprise one or more suitable graphical or textual interfaces that can cooperate with the user input devices 34, 68 to enable the user to customize the settings for one or more of the RKE system 38, exterior lights 58, interior lights 60, audible indicator 62, locks 42, window system 44 and entertainment system 25. The at least one user interface 156 can be displayed on the display 66, and can be superimposed on other user interfaces displayed on the display 66. In one example, the at least one user interface 156 can comprise an interior light user interface 158, a passive lock user interface 160, a window user interface 162, a radio user interface 164, a lock user interface 166, a security light user interface 168, a prompt user interface 170 and a repeat prompt user interface 172.

The interior light user interface 158 can comprise a suitable graphical or textual interface that can cooperate with the user input devices 34, 68 to enable the user to customize the setting of the one or more interior lights 60. The passive lock user interface 160 can comprise a suitable graphical or textual interface that can cooperate with the user input devices 34, 68 to enable the user to customize the RKE system 38. The window user interface 162 can comprise a suitable graphical or textual interface that can cooperate with the user input devices 34, 68 to enable the user to customize a setting of one or more of the windows 46, such as a setting to move one or more of the windows 46 from the first, closed position to the second, opened position relative to the respective one of the doors 36 at a particular geographic location. The radio user interface 164 can comprise a suitable graphical or textual interface that can cooperate with the user input devices 34, 68 to enable the user to customize the radio stations associated with the receiver 82 based on the geographic location of the vehicle 10. The lock user interface 166 can comprise a suitable graphical or textual interface that can cooperate with the user input devices 34, 68 to enable the user to customize the setting of one or more of the locks 42 based on the position of the transmission 26 and the location of the vehicle 10, and can also enable the user to customize the notification that one or more of the locks 42 is actuated to secure the respective doors 36 to the body 40 of the vehicle 10. The security light user interface 168 can comprise a suitable graphical or textual interface that can cooperate with the user input devices 34, 68 to enable the user to customize the duration that the exterior lights 58 are activated based on a geographic location of the vehicle 10.

Figure 5:
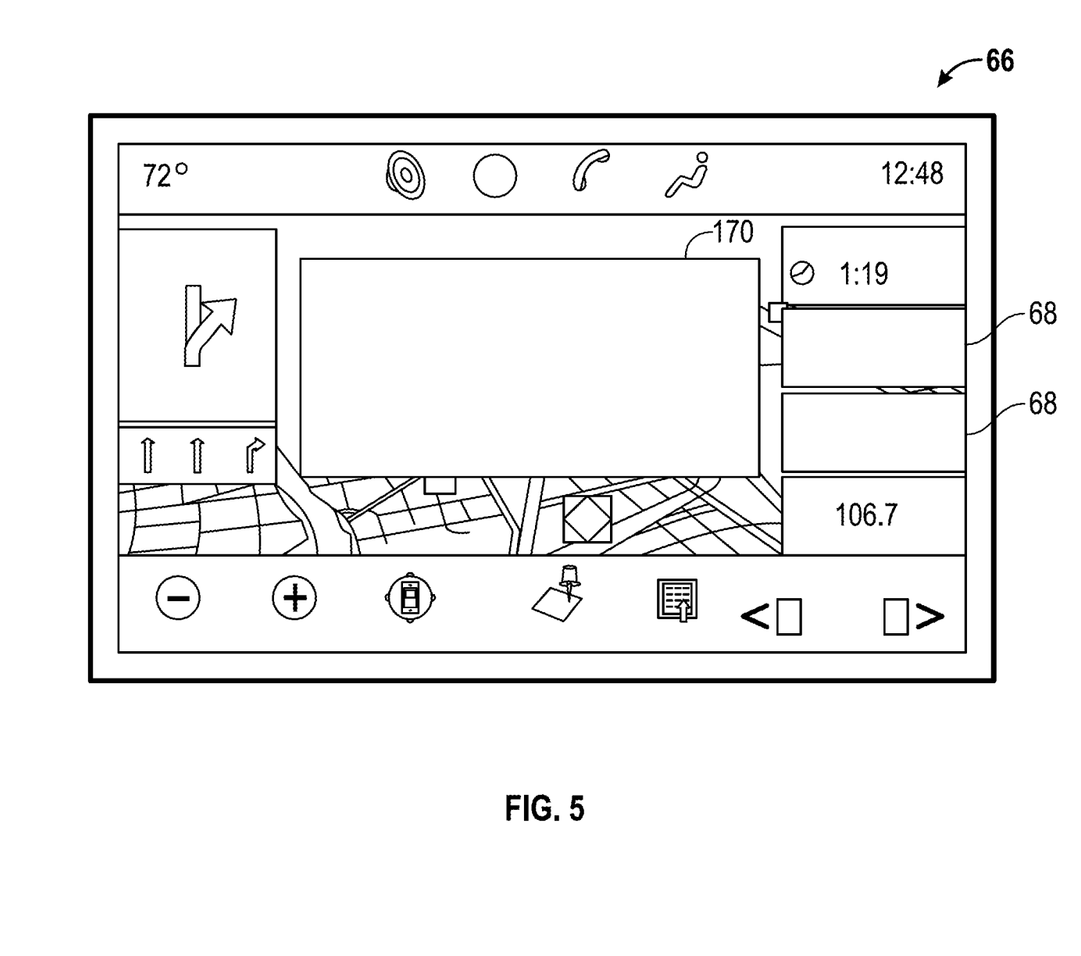
FIG. 5 is an exemplary display illustrating an exemplary prompt user interface.

The prompt user interface 170 can comprise a suitable graphical or textual interface that can cooperate with the user input devices 34, 68 to enable the user to select to save a setting for a geographical location of the vehicle 10 based on the learn data 150. For example, as illustrated in FIG. 5, an exemplary prompt user interface 170 is shown. The prompt user interface 170 can enable the user to save particular settings for a frequented geographical location, and can include one or more user input devices 68. As a further example, based on the prior window action location data 128, the prompt user interface 170 can prompt the user to save a setting for one or more of the windows 46 at a geographical location. For example, the prompt user interface 170 can display a message such as "There is frequent travel to this location. Would you like to remember this location?" With reference to FIG. 3, the repeat prompt user interface 172 can comprise a suitable graphical or textual interface that can cooperate with the user input devices 34, 68 to enable the user to select whether they would like the customization module 24 to prompt them to save a setting for the location upon visiting the geographical location again.

Figure 6:
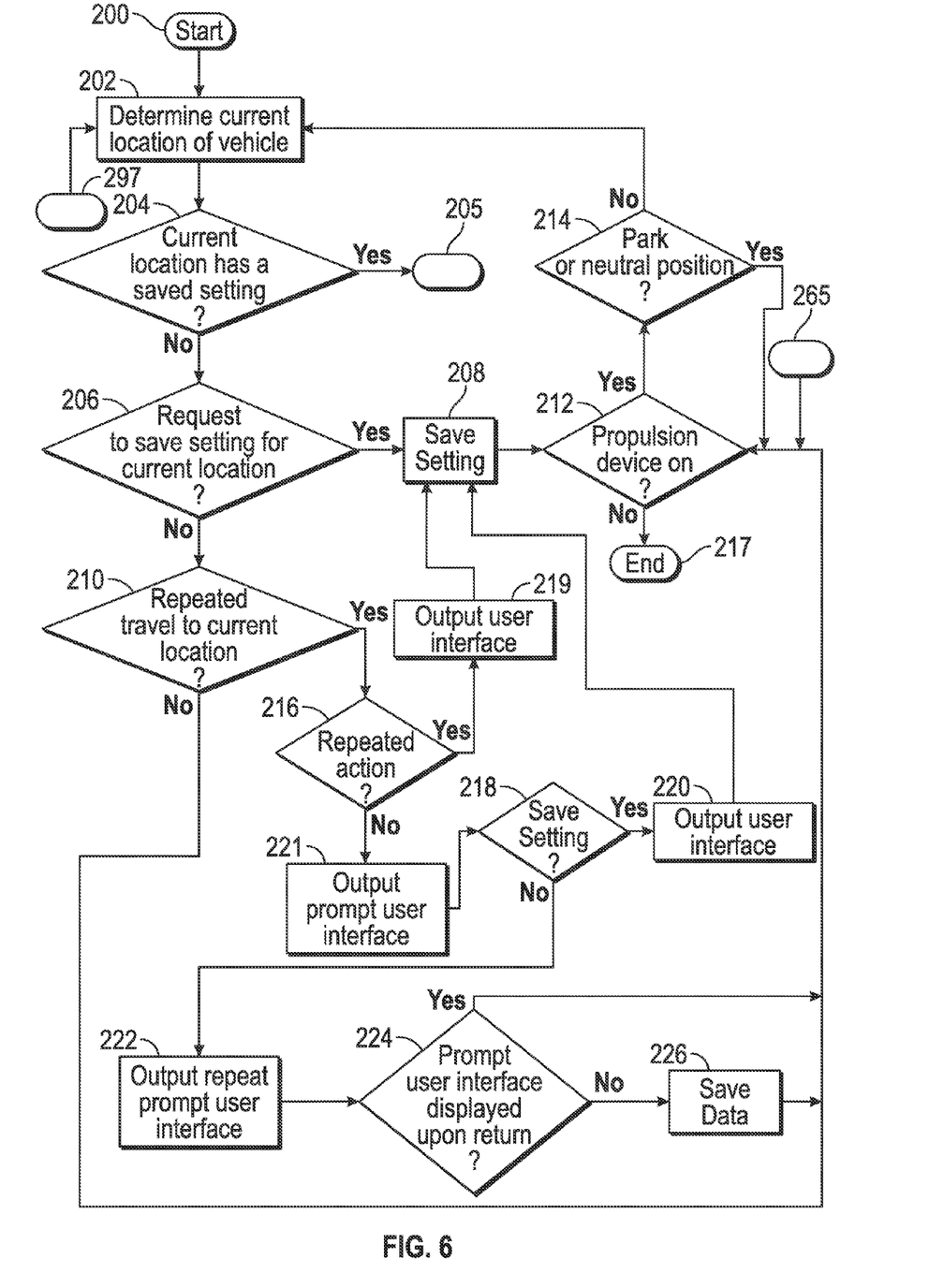
FIG. 6 is a flowchart illustrating a control method of the location customization control system in accordance with various embodiments.
Figure 7:
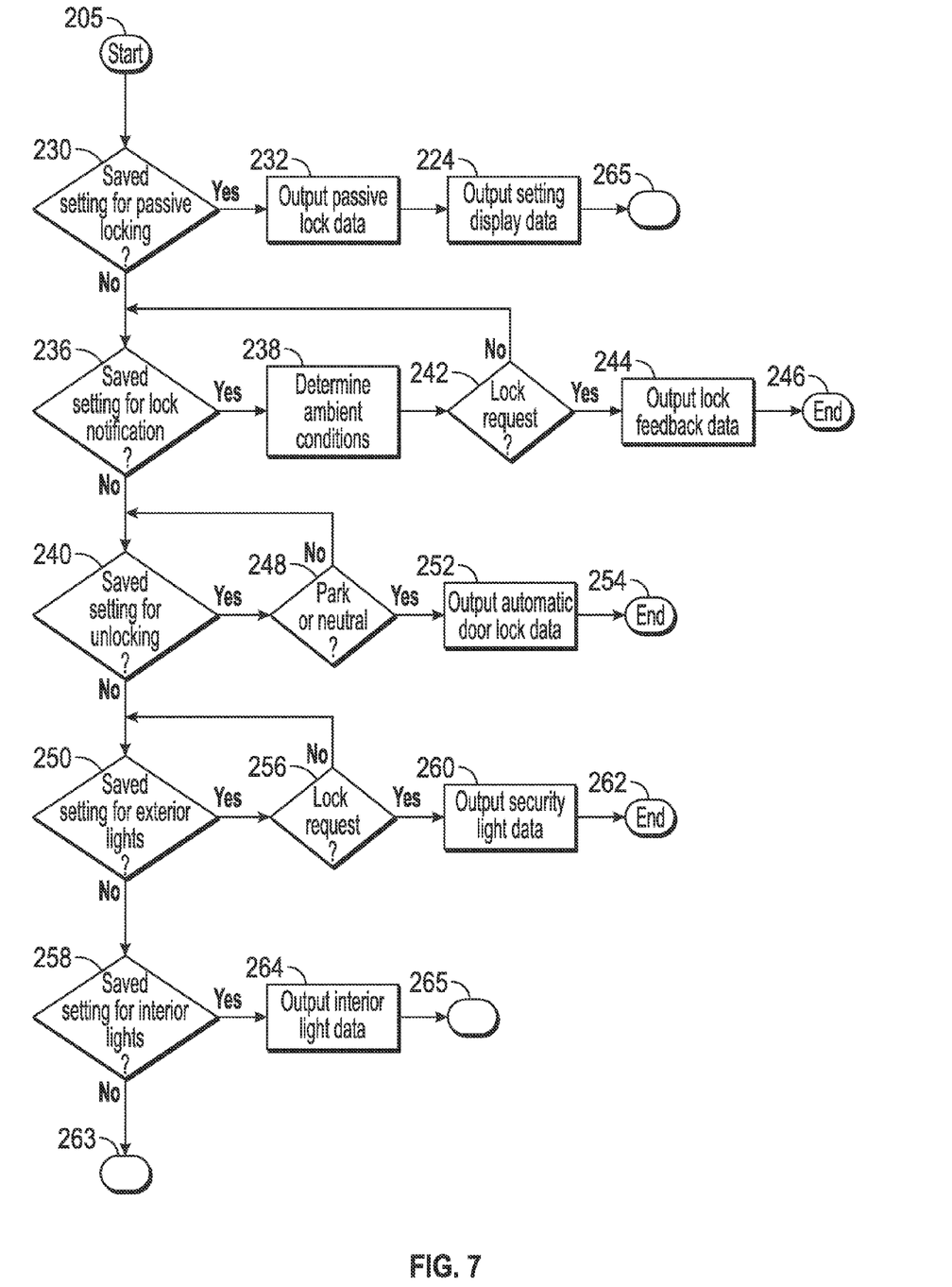
FIG. 7 is a continuation of the flowchart of FIG. 6.
Figure 8:
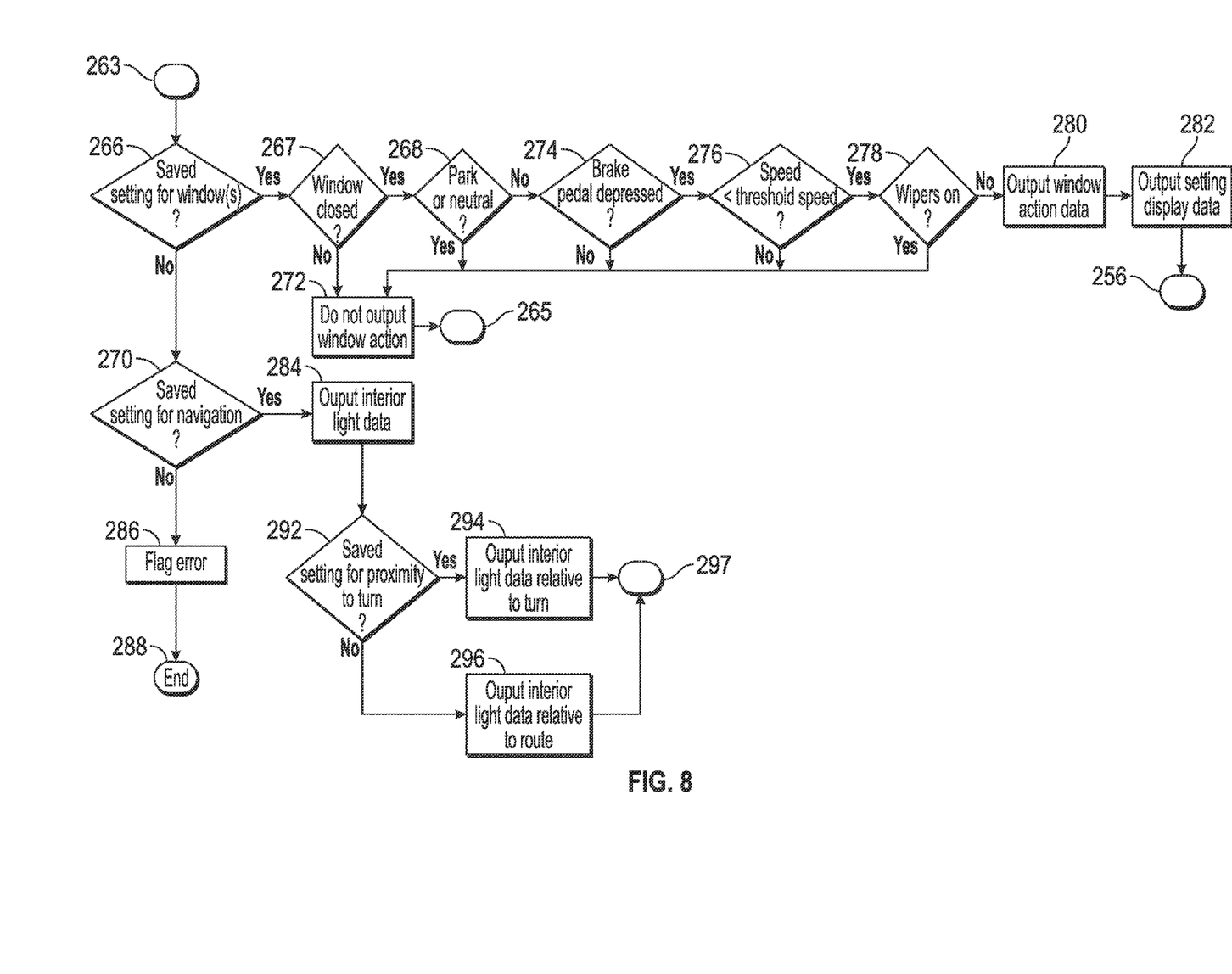
FIG. 8 is a continuation of the flowchart of FIG. 7.

Referring now to FIGS. 6-8, and with continued reference to FIGS. 1 and 3, a flowchart illustrates a control method that can be performed by the customization module 24 of FIG. 1 in accordance with the present disclosure. As can be appreciated in light of the disclosure, the order of operation within the method is not limited to the sequential execution as illustrated in FIGS. 6-8, but may be performed in one or more varying orders as applicable and in accordance with the present disclosure.

In various embodiments, the method can be scheduled to run based on predetermined events, and/or can run continually during operation of the vehicle 10.

The method can begin at 200. At 202, the method can determine a current geographical location of the vehicle 10 based on the location data 108. At 204, the method can determine if the current location has a saved setting by accessing the data store 130 for prior location setting data 126 for the current geographic location of the vehicle 10. If the method determines that the current geographic location has a saved setting, the method goes to 205 on FIG. 7. Otherwise, the method goes to 206.

At 206, the method can determine if a request to save a setting for the current geographic location has been received from the user through the user input devices 34, 68. If a request to save a setting has been received, the method goes to 208. Otherwise, the method goes to 210. At 208, the method saves the setting for the current geographical location. Then, at 212, the method determines if the propulsion device 13 is on, such that the vehicle 10 is on, based on the propulsion data 121. If the propulsion device 13 is on, then the method goes to 214. Otherwise, the method ends at 217. At 214, the method determines if the transmission 26 of the vehicle 10 is in park or a neutral gear position. If the transmission 26 is in park or a neutral gear position, the method loops to 212. Otherwise, the method loops to 202.

At 210, the method determines if there is repeated travel to the current geographic location by accessing the data store 130 for prior location data 127. If the method determines that that there is repeated travel to the current geographical location, the method goes to 216. Otherwise, the method goes to 212.

At 216, the method determines if there is a repeated action at the current geographic location by accessing the data store 130. If there is a repeated action associated with the current geographic location, then at 219, the method outputs the at least one user interface 156 including, but not limited to, the interior light user interface 158, passive lock user interface 160, window user interface 162, radio user interface 164, lock user interface 166, security light user interface 168 to prompt the user to save the repeated action as a desired setting for the current geographical location. Then, the method goes to 208.

Otherwise, at 221, the method outputs the prompt user interface 170 to prompt the user to save a setting for the current geographic location. At 218, the method determines, based on the user input data 152, if the user has selected to save a setting for the location. If the user has selected to save a setting, then at 220, the method outputs the at least one user interface 156, including, but not limited to, the interior light user interface 158, passive lock user interface 160, window user interface 162, radio user interface 164, lock user interface 166, security light user interface 168 to enable the user to select the desired setting for the current geographical location. Then, the method goes to 208.

If at 218, the method determines that the user does not want to save a setting for the current geographic location, the method can go to 222. At 222, the method can output the repeat prompt user interface 172. At 224, the method can determine, based on the user input data 152, if the user would like to have the prompt user interface 170 displayed if they return to the current geographic location. If so, the method loops to 212. Otherwise, the method goes to 226. At 226, the method saves location setting data 151 in the data store 130 that indicates that the user does not want to be prompted to save a setting for the current geographic location of the vehicle 10. Then, the method goes to 212.

With reference to FIG. 7, at 205, the method goes to 230. At 230, the method determines if the current geographic location is associated with a saved setting for the passive locking of the RKE system 38. If the saved setting is for the passive locking of the RKE system 38, then the method goes to 232. At 232, the method outputs the passive lock data 136 for the RKE system 38, and at 234, the method outputs the setting display data 154 for display on the display 66. Then, the method goes to 265 on FIG. 6.

With continued reference to FIG. 7, if the saved setting is not for the passive locking of the RKE system 38, then the method goes to 236. At 236, the method determines if the saved setting is for notification that one or more of the doors 36 are locked. If the saved setting is for notification that one or more of the doors 36 are locked, then the method goes to 238. Otherwise, the method goes to 240. At 238, the method determines the ambient conditions surrounding the vehicle 10 based on the ambient data 120. At 242, the method determines if a request to lock one or more of the doors 36 has been received via lock data 119. If a request to lock one or more of the doors 36 has been received, then the method goes to 244. Otherwise, the method loops. At 244, based on the ambient data 120 and the current geographic location, the method outputs the lock feedback data 138. For example, if the ambient data 120 indicates that the vehicle 10 is in darkness and the vehicle 10 is parked in a known geographic location, then the lock feedback data 138 can include a signal to only activate the exterior lights 58. Alternatively, if the ambient data 120 indicates that the vehicle 10 is in twilight and the vehicle 10 is parked in a known geographic location, then the lock feedback data 138 can include a signal to activate the exterior lights 58 and the audible indicator 62. As a further example, if the ambient data 120 indicates that the vehicle 10 is in daylight and the vehicle 10 is parked in a known geographic location, then the lock feedback data 138 can include a signal to activate the exterior lights 58 and the audible indicator 62. As a further example, if the vehicle 10 is parked in a known geographic location, the method can output lock feedback data 138 to activate the exterior lights 58 only, if desired. Then, the method ends at 246. As yet a further example, the method can output the lock feedback data 138 based on the current geographic location and the time of day associated with the current time zone of the vehicle 10, which can be received as an input to the customization module 24 over the interconnection architecture 98. In this example, the lock feedback data 138 can comprise a signal to activate the exterior lights 58 only at a known geographic location if the time of day indicates that the vehicle 10 would be in darkness.

At 240, the method can determine if the saved setting is for the automatic unlocking of one or more of the doors 36. If the setting is for unlocking one or more of the doors 36, the method can go to 248. Otherwise, the method can go to 250. At 248, the method can determine if the transmission 26 is in park or a neutral gear position based on the transmission data 118. If the transmission 26 is in park or a neutral gear position, the method can go to 252. Otherwise, the method can loop. At 252, the method outputs the automatic door lock data 140. Then, the method ends at 254.

At 250, the method determines if the saved setting is for the extended activation of the exterior lights 58. If the saved setting is for the extended activation of the exterior lights 58, the method goes to 256. Otherwise, the method goes to 252. At 256, the method determines if a request to actuate one or more of the locks 42 has been received from the lock data 119. If a request to actuate one or more of the locks 42 has been received, then the method goes to 260. Otherwise, the method loops. At 260, the method outputs the security light data 142. Then, the method ends at 262. As a further example, the extended activation of the exterior lights 58 can be based on the ambient data 120. In this example, if the ambient data 120 indicates that the vehicle 10 is in sufficient light, the exterior lights 58 can be activated for a reduced period of time. This can conserve vehicle power in instances where the vehicle 10 is in a well-lit area.

At 258, the method determines if the saved setting is for the activation and/or color of one or more of the interior lights 60. If the saved setting is for activation and/or color of one or more of the interior lights 60, then the method goes to 264. Otherwise, the method goes to 263 on FIG. 8. At 264, the method outputs the interior light data 144 for the current geographic location. Then, the method goes to 265 on FIG. 6.

From 263 on FIG. 8, the method goes to 266. At 266, the method determines if the saved setting is an action for one or more of the windows 46. If the saved setting is an action for one or more of the windows 46, then the method goes to 267. Otherwise, the method goes to 270. At 267, the method determines if one or more of the windows 46 is in the first, closed position. If one or more of the windows 46 is in the first, closed position, then the method goes to 268. Otherwise, the method goes to 272. At 272, the method does not output the window action data 146 as the method has determined that one or more of the windows 46 should not be automatically moved from the first, closed position to the second, opened position. Then, the method goes to 265 on FIG. 6.

At 268, the method determines if the transmission 26 is in park or a neutral gear position based on the transmission data 118. If the transmission 26 is in park or a neutral gear position, then the method goes to 272. Otherwise, at 274, the method determines if the brake pedal is depressed, based on the brake data 114. If the brake pedal is depressed, the method goes to 276. Otherwise, the method goes to 272. At 276, the method determines if a speed of the vehicle 10 is less than a threshold speed for the vehicle 10. The threshold speed could be a speed that indicates that the vehicle 10 is slowing to a stop, such as less than about 10 miles per hour, for example. If the speed of the vehicle 10 is less than the threshold speed based on the speed data 112, then the method goes to 278. Otherwise, the method goes to 272. At 278, the method determines if the windshield wipers 78 are on, based on the wiper data 116. If the windshield wipers 78 are on, the method goes to 272. Otherwise, at 280, the method outputs the window action data 146 to move one or more of the windows 46 from the first, closed position to the second, opened position. Then, at 282, the method outputs the setting display data 154 for display on the display 66 to inform the users that one or more of the windows 46 is moving from the first, closed position to the second, opened position. Then, the method goes to 265 on FIG. 6. It should be noted that the method could also output data to move the window from the second, opened position to the first, closed position, after a predetermined distance of travel of the vehicle 10, if desired.

At 270, the method determines if the saved setting is a setting associated with the navigation system 20. If true, the method goes to 284. Otherwise, the method flags an error at 286 and ends at 288. At 284, the method outputs the interior light data 144 to one or more of the interior lights 60 for the proximity to the destination based on the navigation setting data 124 and the location data 108. Then, the method goes to 292. It should be noted that lighting or images associated with the display 66 could also change color based on the proximity to the destination, if desired.

At 292, the method determines if the saved setting is for proximity to a turn. If the saved setting is for proximity to a turn, then at 294, the method outputs the interior light data 144 to one or more of the interior lights 60 for the proximity to the turn based on the navigation setting data 124 and the location data 108. Then, the method goes to 297 on FIG. 6. It should be noted that lighting or images associated with the display 66 could also change color based on the proximity to the turn, if desired.

If the saved setting is not for proximity to a turn, then at 296, the method outputs the interior light data 144 to one or more of the interior lights 60 for the current geographic location relative to the route based on the navigation setting data 124. For example, the interior light data 144 can comprise data to illuminate one or more of the interior lights 60 as green when the current location of the vehicle 10 is along the route, or data to illuminate one or more of the interior lights 60 as red when the current location of the vehicle 10 is not along the route. Then, the method goes to 297 on FIG. 6. It should be noted that lighting or images associated with the display 66 could also change color based on the proximity to the destination, if desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A customization control system for a vehicle having a cabin, comprising:

a source of vehicle location data that provides a current geographic location of the vehicle;

one or more windshield wipers coupled to the vehicle;

a source of windshield wiper data that indicates the windshield wipers are activated or deactivated;

a source of a planned route for the vehicle;

a door coupled to the cabin, the door including a lock and a window movable relative to the door between a first, closed position and a second, opened position;

at least one interior light and a display disposed in the cabin; and a customization module that, based on the vehicle location data and the windshield wipers being deactivated, outputs setting data for the vehicle that moves the window from the first, closed position to the second, opened position, the customization module outputs setting data to illuminate the at least one interior light based on the current geographical location of the vehicle along the planned route, and the customization module outputs a user interface for display on the display to prompt for saving a setting associated with the lock and the current geographical location of the vehicle based on a frequency of travel to the current geographical location, wherein the customization module outputs the setting data to illuminate the at least one interior light based on the current geographical location of the vehicle as off the planned route.

2. The system of claim 1, wherein the system further comprises:
a remote keyless entry system including a fob that generates a signal to actuate the lock to secure the door to the cabin of the vehicle, and the customization module outputs setting data to disable locking of the lock with the fob based on the vehicle location data.

3. The system of claim 1, further comprising:
a source of speed data that indicates a speed of the vehicle, wherein based on the vehicle location data, the speed data, and the windshield wipers being deactivated, the customization module outputs setting data to move the window from the first, closed position to the second, opened position.

4. The system of claim 3, further comprising:
a source of brake data that indicates a position of a brake pedal of the vehicle,
wherein based on the vehicle location data, the speed data, the brake data and the windshield wipers being deactivated, the customization module outputs setting data to move the window from the first, closed position to the second, opened position.

5. The system of claim 1, further comprising:
at least one source of user input;
wherein the customization module outputs setting data to illuminate the at least one interior light based on the vehicle location data and the user input.

6. The system of claim 1, wherein the system further comprises:
a transmission coupled to a driveline of the vehicle, wherein the customization module outputs setting data to substantially automatically unlock the lock based on a range of the transmission and the vehicle location data.

7. A vehicle, comprising:
a passenger cabin including a door having a lock that is actuatable to lock the door to the cabin, a window coupled to a window actuation device that is actuatable to move the window relative to the door from a first, closed position to a second, opened position and a display;
a remote keyless entry system that generates a signal to actuate the lock;
a source of location data that provides a current geographic location of the vehicle;
a customization module that controls the lock and the window based on the location data, and the customization module:
actuates a window actuation device to move the window from the first, closed position to the second, opened position based on the location data;
disables the actuation of the lock by the remote keyless entry system based on the location data; and
outputs a user interface for display on the display to prompt for saving a setting associated with the actuation of the window actuation device and the current geographical location of the vehicle based on a frequency of travel to the current geographical location.

8. The vehicle of claim 7, wherein the customization module actuates the window actuation device to move the window from the first, closed position to the second, opened position based on a speed of the vehicle.

9. The vehicle of claim 7, wherein the customization module actuates the window actuation device to move the window from the first, closed position to the second, opened position based on a range of a transmission of the vehicle.

10. The vehicle of claim 7, wherein the customization module outputs a user interface for display on the display that indicates that the actuation of the lock by the remote keyless entry system has been disabled.

\* \* \* \* \*